Feb. 8, 1938.　　　E. McCORMICK ET AL　　　2,107,760
HYDRAULIC MECHANISM
Filed Oct. 24, 1934　　　3 Sheets-Sheet 2

Inventors:
Elmer McCormick.
Wayne H. Worthington.
Mitford D. Stewart.
By: Brown, Jackson, Boettcher & Dienner
Attys.

Patented Feb. 8, 1938

2,107,760

UNITED STATES PATENT OFFICE 2,107,760

HYDRAULIC MECHANISM

Elmer McCormick, Milford D. Stewart, and Wayne H. Worthington, Waterloo, Iowa, assignors to John Deere Tractor Company, Waterloo, Iowa, a corporation of Iowa Application October 24, 1934, Serial No. 749,706

39 Claims. (Cl. 60—52)

The present invention relates generally to hydraulic mechanisms and is particularly concerned with new and improved hydraulic mechanism for tractors and the like for use as power lift mechanism therefor.

The principal object of the present invention is the provision of a hydraulic mechanism which is provided with such control means that a momentary actuation of the control lever is sufficient to cause the hydraulic mechanism to operate through a predetermined cycle of movement, similar to the half-revolution type of mechanical power lift clutch in use at the present time.

A further object of the present invention is the provision of means for automatically shifting the hydraulic controlling mechanism whenever the hydraulic mechanism is operated to the desired point or through the required extent.

Another object of the present invention is the provision of new and improved controlling apparatus for hydraulic mechanisms, particularly adapted for hydraulic mechanisms that are used as power lift operating means for farm tractors and the like. In this connection, the present invention contemplates arranging the controlling valve means so that it is moved successively to different positions by successive operations of a controlling member, manual or otherwise, to cause the power lift to be raised, locked in raised position, and lowered, all in sequential relation, and a further object of the present invention is to provide progressively actuated ratchet mechanism for positioning the controlling valve means in the several positions to secure the above operation.

A further object of the present invention, having particularly to do with the means by which the present hydraulic mechanism is adapted for use as the power lift means for a tractor, is the provision of new and improved housing members upon which the various operating parts of the hydraulic mechanism are mounted and by which they are secured in place on the tractor so as to serve effectively as the power lift mechanism thereof. A still further object of the present invention in this connection is to utilize the power take-off shaft for driving the hydraulic mechanism having the above mentioned characteristics.

A further object of our invention is to provide a hydraulic mechanism which is controlled by a trip lever in very much the same manner as a conventional mechanical power lift apparatus. Specifically, it is an object of our invention to provide a hydraulic lift having such control mechanism as is responsive to a momentary actuation of the trip lever to cause the power lift to operate to raise an implement, the control mechanism being arranged also to be responsive to a second momentary actuation of the trip lever to cause the implement to be lowered, these operations for controlling the lift being, therefore, substantially the same as the corresponding controlling operations for the mechanical half revolution type of power lift which is well known to those skilled in the art.

These and other objects and advantages of the present invention will be apparent to those skilled in the art after a consideration of the following detailed description, taken in conjunction with the accompanying drawings illustrating the preferred embodiment of our invention.

Figures 1, 10:
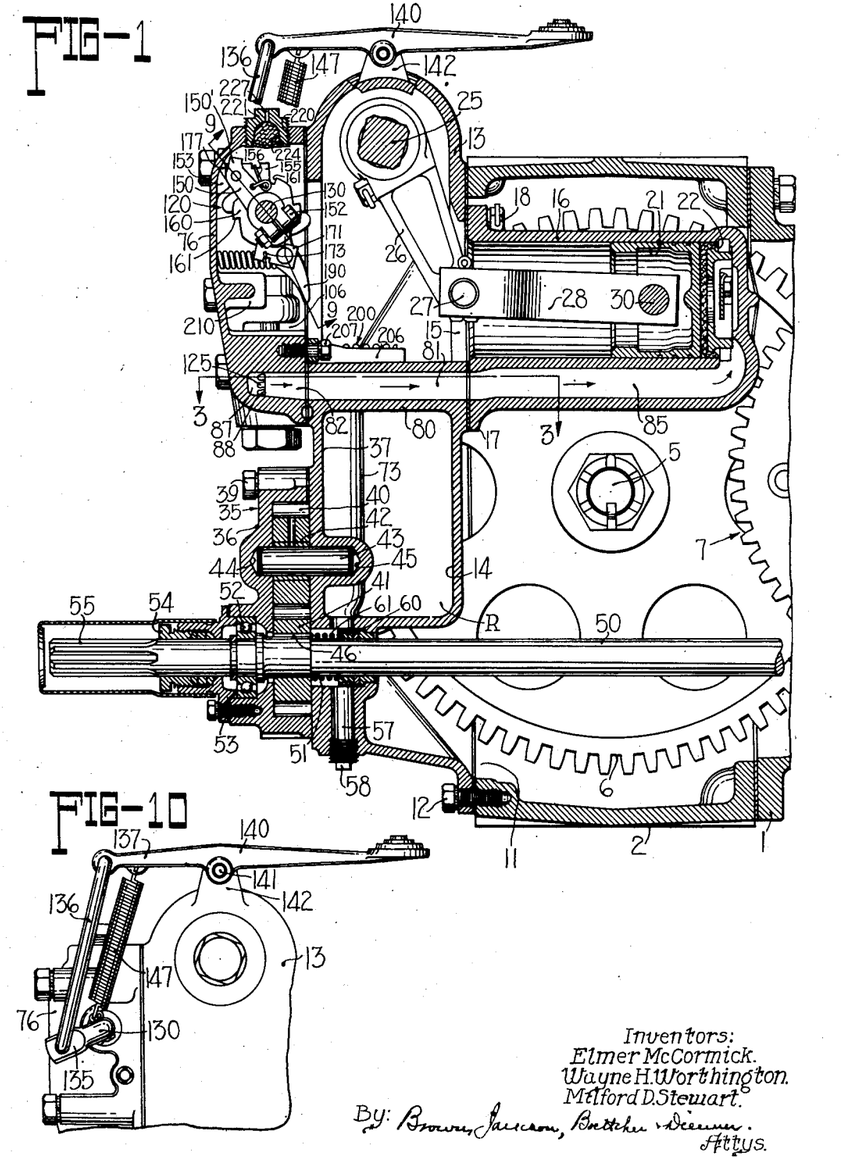
Figure 1 is a vertical longitudinal section taken through the rear end of a tractor in which the present invention has been embodied, Figure 1 corresponding to a section taken along the line 1—1 of Figure 2.
Figure 10 is a fragmentary side view illustrating the trip lever and its connection to the ratchet advancing mechanism.

Referring now more particularly to Figure 1, the reference numeral 1 indicates the rear portion of the combined crank case and supporting framework of a tractor of well known construction, and the reference numeral 2 indicates the rear axle housing of such a tractor, the rear axle housing being in this case of the banjo type. Such axle housing comprises laterally directed housing extensions 3 and 4 (Figure 3), and in each of these housing extensions a drive shaft 5 is journaled by any suitable means and each carries a large driving gear 6 actuated by suitable transmission mechanism and differential means which are indicated in their entirety by the reference numeral 7. It is to be understood, of course, that while we shall describe our hydraulic mechanism in connection with a farm tractor, in its broader aspects our invention is not to be limited in all cases to such association. However, we prefer to illustrate our invention by showing our hydraulic mechanism as mounted on a tractor, and in several details certain features of our invention are particularly concerned with providing improved power lift apparatus for such tractors.

According to our invention, the hydraulic mechanism comprises a unit which is adapted to be bolted over the rear opening 11 of the axle housing 2, and more specifically, our hydraulic power lift unit includes a housing which is adapted to be substituted for the rear cover plate which, in tractors of the above mentioned type, is adapted to be bolted, as by bolts 12, over the rear opening 11. When our hydraulic mechanism is constructed in the form of such a power lift unit, the unit is made up of a central housing 13 which is bolted over the rear opening 11 in the same manner that the rear cover plate, referred to above, is normally bolted. The central housing 13 includes a forward wall 14 in the upper portion of which is an opening 15, and over this opening there is secured a cylinder 16 which extends forwardly substantially into the body of the tractor and between the driving gears 6 associated with the two drive shafts 5. The forward end of the cylinder 16 is closed while the rear end is flanged, as at 17, and is secured by bolts 18 over the opening 15 in the central housing 13. A piston 21 is slidably mounted within the cylinder 16 and is provided with suitable sealing means 22 by which the piston is rendered leak-tight within the cylinder 16.

Figure 2:
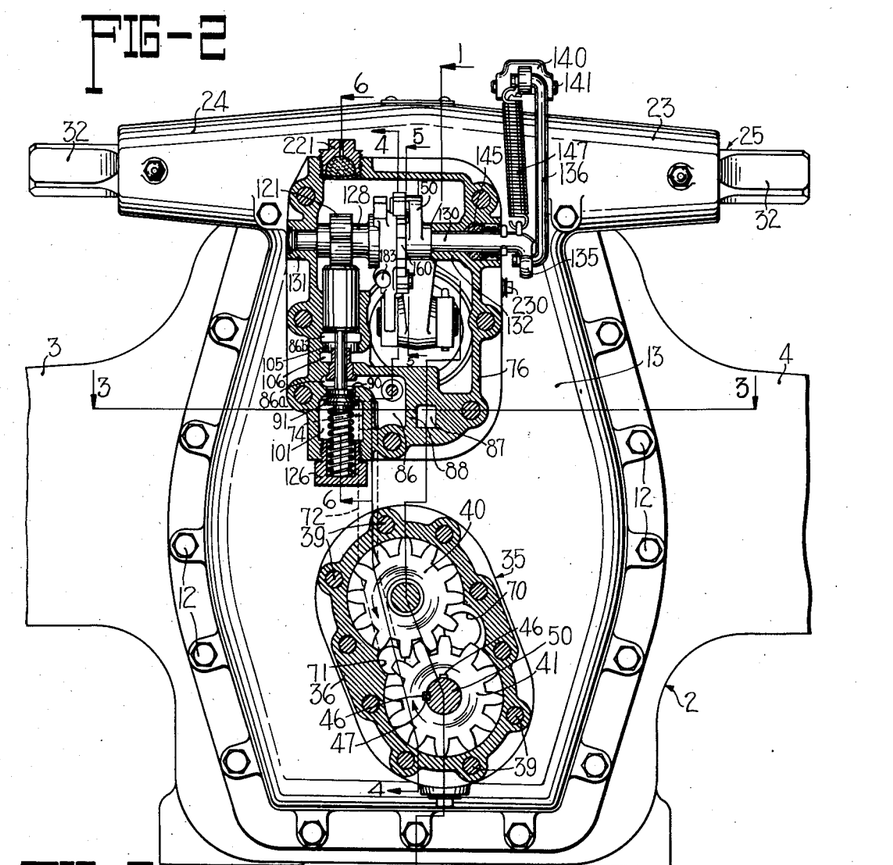
Figure 2 is a rear view, looking forwardly, of the construction illustrated in Figure 1, with certain parts of the casing members being shown in section in order to better illustrate the operating mechanism.

As best shown in Figure 2, the upper portion of the central housing 13 is formed with right and left hand lateral housings or sleeve portions 23 and 24, and these portions carry suitable bearing means in which a lifting rock shaft 25 is mounted for rocking movement. The central portion of the rock shaft 25 carries an arm 26 fixed thereto by any suitable means and is arranged to extend in a generally downward direction within the central housing 13. The downward or outer end of the arm 26 carries a pin 27 or the equivalent, and a pair of pitman straps 28 serve to connect the pin 27 with a wrist pin 30 carried by the piston 21. By this means, therefore, the piston 21 is operatively connected with the rock shaft 25 so that when the piston is forced outwardly of the cylinder 16, that is, to the left as viewed in Figure 1, the rock shaft 25 is rocked in a clockwise direction as viewed in this figure. The rock shaft 25 has squared ends 32 to receive lifting arms (not shown) which are connected by any suitable lifting connections with the implements or other operating units associated with the tractor.

The means for creating the pressure necessary to operate the piston 21 is, according to our invention, in the form of a hydraulic pump of the positive displacement type. The pump, which is indicated in its entirety by the reference numeral 35, is best shown in Figures 1 and 2 and comprises a housing 36 or pump body carried by and secured to the rear wall 37 of the central or power lift housing 13 by bolts 39. The pump gears are indicated at 40 and 41, the gear 40 being journaled on a bearing 42 supported on a pin or short shaft 43 which is disposed in sockets 44 and 45 formed in the pump body casting 36 and in the rear wall 37 of the power lift housing 13. The other pump gear 41 is provided with two slots 46 (Figure 2) in one of which a key 47 is placed for securing the gear 41 to a power take-off shaft 50 which extends forwardly into the tractor body 1 and is operatively connected with the tractor motor by any suitable means. The shaft 50 extends rearwardly, longitudinally of the tractor, between the two main driving gears 6 and through an opening 51 in the rear wall 37 of the power lift housing 13 and is journaled in a bearing 52 supported by the pump housing 36. The opening receiving the bearings 52 is closed by a cap 53, and the rear end of the power take-off shaft 50 extends therethrough and is sealed by suitable bushing means 54 and is splined, as at 55, to receive suitable power take-off connections by which any operating unit or units may be driven by the rotation of the shaft 50. The portion of the power lift casting or housing 13 adjacent the opening 51 in the lower part thereof is provided with a drain opening 57 which is sealed by a drain plug 58, and the shaft 50 is sealed in the opening 51 by suitable packing 60 held in place by an oil seal spring 61.

Figures 3, 4, 5, 6, 7, 8:
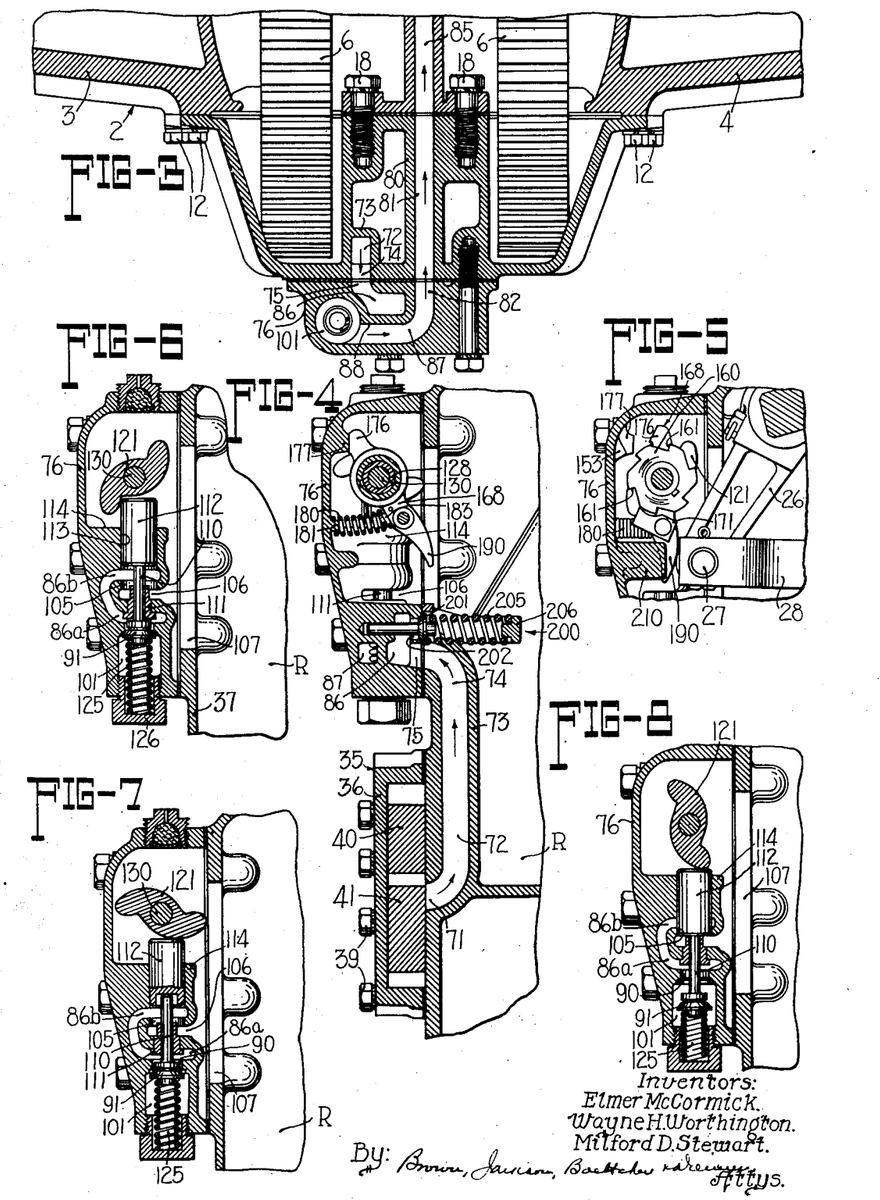
Figure 3 is a fragmentary section taken along the lines 3—3 of Figures 1 and 2.
Figure 4 is a vertical section taken along the line 4—4 of Figure 2.
Figure 5 is a section taken along the line 5—5 of Figure 2.
Figure 6 is a vertical section taken along the line 6—6 of Figure 2 showing the controlling valve mechanism in the position corresponding to the hydraulically locked position of the apparatus.
Figures 7 and 8 are sections similar to that illustrated in Figure 6, and showing the two other positions of the controlling valve means.

The pump gears 40 and 41 are rotated in the direction of the arrows in Figure 2 by the rotation of the shaft 50, and the rotation of the gears in the direction indicated builds up pressure in one side of the pump housing 36 and creates suction in the other side of the housing. On the suction side of the pump housing the rear wall 37 of the power lift housing 13 is provided with an opening 70 (Figure 2), and a similar opening 71 is provided on the other side of the pump housing 36 at the pressure side of the pump 35. The opening 70 affords communication between the suction side of the pump and the lower portion of the housing 13, which forms a reservoir R for the hydraulic fluid, and the other opening 71 leads into a vertically disposed channel 72 formed in a thickened section 73 at the rear wall 37, as best shown in Figures 1, 3 and 4. In Figure 2 the vertical pressure channel is indicated in dotted lines. The channel 72 has its upper terminal end 74 facing rearwardly in registration with a companion opening 75 formed in a valve housing 76 which will be referred to later.

In the central portion of the housing 13 a section 80 extends from the rear wall 37 to the front wall 14 thereof and is provided with an interior channel or bore 81 leading from a registering opening 82 formed in the valve housing 76. The forward end of the channel 81 registers with a channel 85 formed in the lower section of the cylinder casting 16, and the channel 85 leads forwardly and into the closed end of the cylinder 16, as best shown in Figure 1.

The valve housing 76 encloses all of the valve parts and associated controlling mechanism, as best shown in Figures 1 and 2, and this valve mechanism is arranged to control the flow of fluid between the pressure conduit 72 and the channels 81 and 85 communicating with the closed end of the cylinder 16. As best shown in Figures 2 and 3, the valve housing 76 includes two chambers 86 and 87 which are separated from one another by a wall 88, the chamber 86 communicating through the opening 75 with the upper end 74 of the pressure channel 72, while the other chamber 87 communicates through opening 82 with the channel 81 in the bored housing section 80. As best shown in Figure 2, the chamber 86 extends upwardly and laterally, as at 86a, in communication with a valved opening 90 controlled by a valve 91. The space below the valve 91 forms a chamber 101 which, as best shown in Figure 3, is in communication with the channel 87 formed in the lower portion of the valve housing 76. Thus, the liquid under pressure from the pump 35 is forced upwardly through the pressure channel 72, into the chamber 86 and up into the upper section 86a (Figure 2), and then if the valve 91 is open, the liquid passes through the opening 90 into the chamber 101 and around through the channel 87 into the bore 81, from whence the liquid passes through the channel 85 into the closed end of the cylinder 16.

The upper chamber section 86a of the pressure chamber 86 is extended upwardly, as at 86b in Figure 6, and communicates through an opening 105 with the space 106 above the wall forming the upper portion of the pressure chamber section 86a. The space 106, as best shown in Figures 6, 7 and 8, is in communication with the reservoir R through an opening 107 which is formed in the rear wall 37 of the power lift housing 13.

The valve 91 is fixedly mounted on a stem 110 which passes through a bushing 111 in the section forming the upper wall of the chamber section 86a, and at its upper end the valve stem 110 carries a sleeve 112 which is of generally cylindrical formation and is slidable in a cylindrical opening 113 formed in the thickened section 114 of the valve housing 76 and which serves as the upper wall of the chamber section 86b. The sleeve 112 is of the same diameter as the diameter of the opening 105 so as to serve as a valve closure therefor, as will appear later, and the stem 110 is of a length to permit the valve 91 to move well toward its full open position before the sleeve or plunger 112 approaches the opening 105.

The entire unit, comprising the valves 91 and 112, may be shifted to three different positions. Figure 6 shows the position in which the valve 91 is closed, preventing the pressure in the chamber 86, communicated thereto through the channel 72 from the pump 35, from entering into the chamber 87 and into the cylinder 16. In this position of the valve means, however, the cylindrical valve 112 is open, leaving the opening 105 unobstructed so that the liquid under pressure in the chamber 86 passes therefrom upwardly through the chamber sections 86a and 86b and out through the opening 105 back into the reservoir R. Thus, in this position of the valve unit, the pump 35 runs free and no pressure is transmitted to the cylinder 16. On the other hand, any liquid trapped in the closed end of the cylinder 16 is held therein by the closing of the valve 91, since the opening 90 is the only means by which liquid within the closed end of the cylinder 16 can escape. Thus, the piston 21 is held hydraulically locked in the position it occupied when the valve 91 was closed.

The second position of the valve means is illustrated in Figure 7 in which the valve 91 is opened a small amount, but the valve 112 is caused to remain substantially in its wide open position. Since this latter valve is still in its wide open position, no pressure is developed by the pump, since the liquid in the pressure chamber 86b merely discharges back into the reservoir R through the opening 105. However, since the valve 91 is now open, the liquid within the closed end of the cylinder 16 may escape by flowing backwardly or rearwardly through the channels 85 and 81 into the chamber 87 and up past the valve 91 and through the opening 90 into the chamber 86a, from whence this liquid also is discharged into the reservoir R. Thus, the opening of the valve 91 relieves any pressure within the cylinder 16 occasioned by any reaction of the load acting against the piston through the rock shaft 25 and the arm 26.

The third position of the valve unit is illustrated in Figure 8. In this position it will be seen that the valve 112 closes off the opening 105 entirely and opens the valve 91 to its wide open position. Now the liquid forced upwardly through the pressure channel 72 into the chamber 86 and the upper section 86a passes downwardly through the opening 90 and into the chamber 101, from whence the liquid flows under pressure through the channels 87, 81 and 85 into the closed end of the cylinder 16. Since now the valve 112 is closed, direct communication between the pump and the reservoir is cut off, the pressure developed by the pump is imposed on the piston 21, which then moves from its position shown in Figure 1 to swing the arm 26 in a clockwise direction. Then, however, as the valve 112 is opened and the valve 91 closed, this being the position shown in Figure 6, the liquid under pressure in the cylinder 16 will be trapped by the closing of the valve 91 and the liquid under pressure coming from the pump will discharge through the opening 105 and the space 106 back into the reservoir again, whereby the piston 21 will be held hydraulically locked. Suitable means, which will be described later, has been provided by which the movement of the piston 21 toward its left hand limit, as viewed in Figure 1, automatically shifts the valve means from the position shown in Figure 8 to the position shown in Figure 6.

The valve control mechanism is indicated in its entirety by the reference numeral 120 and includes a cam member 121 mounted in the upper portion of the valve housing 76 and is adapted to be progressively advanced from one position to another in succession for the purpose of, first, emptying the cylinder 16 to permit the load to lower by shifting the valve means to the position shown in Figure 7, then applying pressure to the piston 21 by shifting the valve means to the position shown in Figure 8 to cause the pressure of the pump to force the piston outwardly, and then, lastly, shifting the valve means to the position shown in Figure 6 for hydraulically locking the piston in its outer position. Such control mechanism will now be described.

The valve unit 91—112 is biased for movement toward the position shown in Figure 6 by a spring 125 which is disposed in the chamber 101. The spring 125 is seated in a plug 126 which has a suitable opening for receiving the lower end of the valve spring 125 and is threaded into an opening in the lower portion of the valve housing 76, as best shown in Figures 2 and 6. The valve operating cam 121 is of generally S formation and is fixedly mounted on or formed integral with a sleeve 128 (Figure 9) which is journaled for rotation on a rock shaft 130. The rock shaft 130 is rockably mounted in a pair of bearing bosses 131 and 132 (Figure 2) which are disposed on the opposite side walls of the valve housing 76. One end of the rock shaft 130 is formed with a crank 135 which is connected by a link 136 with one end 137 of a trip lever 140, as best shown in Figure 10. The trip lever 140 is journaled upon a pivot pin 141 which is mounted in a pair of lugs 142 suitably secured to the upper portion of the power lift housing 13. Suitable packing means 145 (Figure 2) seals the rock shaft 130 in the valve housing 76. A spring 147 serves to bias the trip lever 140 to cause the same to swing the crank arm 135 downwardly to the position shown in Figure 10.

Figure 9:
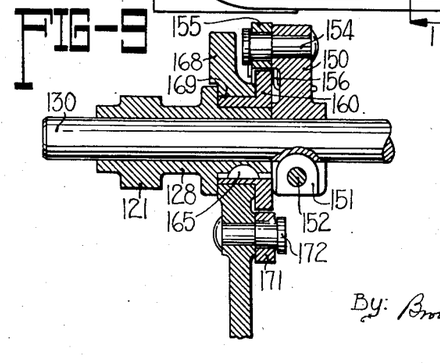
Figure 9 is a section taken along the line 9—9 of Figure 1 and showing on a somewhat enlarged scale certain parts of the ratchet advancing mechanism for the controlling valve means.

Keyed to the rock shaft 130 is a member which carries a pawl that is adapted to engage a ratchet member keyed to the sleeve 128 on which the cam 121 is mounted, so that by rocking the shaft 130, the cam 121 may be moved to various positions. Referring now to Figure 9, an arm 150 is mounted on the rock shaft 130 and is locked thereto by means of a key 151 and a bolt 152 so that the arm 150 is oscillated whenever the shaft 130 is rocked. A stop lug 153 (see Figures 1 and 5) is formed on the inner side of the housing 76 against which the upper end of arm 150 normally rests. The arm 150 also has a stop lug 150' formed on its upper end and positioned to engage the rear wall of the central housing 13 to limit the rocking of the shaft 130 to slightly more than 60 degrees of angular movement for a purpose which will appear later. The arm 150 is also provided with a pivot pin 154 which carries a pawl 155. The pawl 155 is biased, as by a spring 156, for engagement with a ratchet plate 160 having teeth 161, and the ratchet plate 160 is secured, as by a key 165, to one end of the sleeve 128.

The pawl 155 is positioned to engage the ratchet teeth 161 so that whenever the shaft 130 is rocked through at least 60 degrees, the pawl 155 engages one of the teeth 161 and advances the ratchet plate 160 and the cam sleeve 128 secured thereto through an angular distance equivalent to advancing the ratchet plate 160 one notch or tooth.

In order to prevent the force of the spring 125 from forcing the cam backwardly, means have been provided for preventing the backward rotation of the ratchet plate 160. To this end, a member 168 (Figure 9) is journaled over the hub 169 of the ratchet plate 160 for rotation with respect thereto, and the member 168 carries another spring controlled pawl 171, the latter being mounted on a pin 172 carried by the member 168 and biased by means of a spring 173 (Figure 1) toward engagement with one of the ratchet teeth 161. The member 168 is provided with an end 176 which is normally held in engagement with a stop lug 177 by means of a spring 180, the rear end of which is disposed over a lug 181 on the rear wall of the valve housing 76, as shown in Figure 4, while the forward end of the spring 180 is disposed over a lug 183 carried by the member 168. Thus, any tendency for the member 121 to be shifted in a counter-clockwise direction, as viewed in Figures 6 to 8, is resisted by the engagement of the pawl 171 with one of the ratchet teeth on the ratchet 160 and by the engagement of the end 176 of the member 168 with stop lug 177. By virtue of this construction, whenever the trip lever 140 has been actuated to swing the rock shaft 130 through its range of angular movement to advance the ratchet 160 one notch, the pawl 171 drops behind the next notch and prevents any backward rotation of the ratchet 160, hence the valve cam 121 is held in its new position.

The operating fluid for hydraulic mechanisms of this type is usually oil, and assuming that the control mechanism has been previously operated to force the piston 21 to the left and to hydraulically lock the piston in this position, the valve mechanism will be in the position shown in Figures 5 and 6. Now if the trip lever 140 is momentarily depressed to its lower limit, as determined by the stop 150' on the arm 150, the latter will be rocked and the pawl 155 will shift the ratchet member 160, and the sleeve 128 secured thereto, through 60 degrees. This will swing the valve cam 121 through the same number of degrees from the position shown in Figures 5 and 6 to that shown in Figure 7. The curve of the cam member 121 is such that, although the shaft 130 has been rocked to 60 degrees, the valve unit will be lowered only a relatively small amount, just sufficient to open the valve 91 slightly but not sufficient to cause the valve 112 to close. This will be the position to which the parts are moved to lower the implement or other load imposed on the lifting rock shaft 25, for by thus opening the valve 91 a slight amount the hydraulic lock will be broken and by leaving the valve 112 open, the oil from the pressure side of the pump will be returned through the opening 105 directly back to the reservoir R without creating any pressure. The moment the valve 91 is opened the load on the rock shaft 25 immediately moves the piston 21 toward its right hand position shown in Figure 1, and this initial movement shifts the arm 26 away from the locked position (Figure 5), even before the operator has had time to remove his foot from the trip lever 140. This movement of the arm 26 releases the member 168 and permits it to resume its position shown in Figure 4. After the operator removes his foot from the trip lever 140, the spring 125 tends to force the valves 91 and 112 upwardly, but their movement in this direction is restrained by the holding pawl 171 engaging one of the ratchet teeth 161. Therefore, unless the trip lever 140 is tripped or momentarily depressed again, the implement will be lowered and the parts will return to and remain in the position shown in Figures 1 and 7. If, now, it is desired to raise the load, the lever 140 is again momentarily depressed to its lower limit, which will cause the rock shaft 130 to advance the ratchet 160 another notch. This will shift the valve cam 121 from the position shown in Figures 1 and 7 to the position shown in Figure 8. In this position, the valve 91 has been moved downwardly against the tension of the spring 125 into its full open position, and at the same time the valve 112 has been moved downwardly to close off the opening 105. No oil can now escape back to the reservoir and all of it is forced through the opening 99 and into the channels 37, 81 and 85, toward the closed end of the cylinder 16. This forces the piston 21 forwardly in the cylinder 16 which, by reason of the connection of the pitman straps 28 with the lower end of the arm 26, causes the rock shaft 25 to be rocked and the implement parts or other load connected therewith to be lifted.

When the piston 21 has been moved rearwardly, to the left as viewed in Figure 1, to dispose the implement in a lifted position, the piston will engage an arm projection 190 mounted on or serving as a part of the member 168, and the pawl 171 will be swung with the member 168 as the piston completes its rearward movement. The extent of the resulting movement of the member 168 by the piston, while not 60 degrees, is sufficient to shift the ratchet plate 160 and the valve cam 121 over the high point on the cam. The spring 125 then forces the valves 91 and 112 upwardly and forces the cam 121 to rotate to the position shown in Figure 6. During this movement, the arm 150 is not moved, the pawl 155 merely ratcheting over the teeth on the ratchet plate 160. The resultant closing of the valve 91 prevents the transmission of any further oil toward the closed end of the cylinder 16 and the opening of the valve 112 causes the pump to discharge directly into the reservoir R through the opening 105.

An overload release mechanism 200 (Figure 4) is also provided, and this mechanism comprises a valve 201 positioned to maintain closed a passageway 202 leading from the chamber 86 into the reservoir R. The valve 201 is yieldingly held in closed position by a relatively heavy compression spring 205 which bears at one end against the valve 201 and at the other end against the base of a U-shaped bracket 206 which is secured, by bolts 207, to the valve housing 76, as best shown in Figure 1. Thus, whenever the pressure in the pressure channel 72 and the chamber 86 exceeds a certain maximum, the valve 201 is forced open and permits the oil in the chamber 86 to escape through the passage 202 into the reservoir R.

It will be remembered that in the raising operation the oil under pressure is forced against the piston 21 to move the same rearwardly and swing the lifting rock shaft 25, the rearmost movement of the piston serving to swing the arm projection 190 to change the valves to a position in which the piston 21 is hydraulically locked. For the purpose of preventing any accidental excessive amount of rearward movement of the piston 21, whereby the arm 26 might be jammed into the valve control mechanism, we provide a lug 210 (Figures 1 and 5) on the rear wall of the valve housing 76. This lug 210 extends forwardly within the valve housing so as to be disposed in the path of movement of the arm 26 on the lifting rock shaft 25. This lug thus provides a stop for absolutely limiting the rearward movement of the piston and prevents the arm 26 from being forced into contact with the valve control mechanism in case the latter does not function to shift the valves from the position shown in Figure 8 to the position shown in Figure 6. In the event that the valves were not shifted properly and pressure continued to be applied to the piston 21, when the arm 26 engages the stop lug 210 the pressure in the chamber 86 would build up sufficiently to cause actuation of the overload release valve 201, so that no damage would be done to the mechanism.

Oil is inserted into the hydraulic unit through an opening 220 in the top of the casing 76, as best shown in Figure 1. This opening is normally closed by means of a plug 221 threaded into the opening. The plug 221 is provided with a depression 224 therein which is filled with moss or the equivalent held in position by means of a washer or the like. A small boring 227 extends into the recess 224 and the washer has a small opening therein in its center, to provide a breather for the hydraulic unit. The unit is filled with oil up to the level of a plug 230 (Figure 2) threaded into an opening on the right side of the valve housing 76.

The hydraulic unit may be drained by removing the drain plug 58 which is threaded into the boring 57 referred to above. Oil leakage past the lower pump gear 41 enters the space around the shaft 50 and lubricates the bearings 52, and in order to prevent the leakage from the pump from building up a pressure in the space occupied by the bearings 52, the lower pump gear 41 is provided with the extra slot 46 (Figure 2) so that oil may flow through this slot and into the opening 51 and back up into the reservoir R. The space surrounding the bearing 52 and the openings 46 and 51 are therefore normally filled with oil under no greater pressure than the head of oil in the reservoir R. Preferably, the slot 46 is a keyway identical with the keyway which receives the key by which the gear 41 is secured on the shaft 50, as mentioned above. By virtue of this construction, in assembling the hydraulic mechanism, the operator can insert the key in either of these slots, the other serving to conduct the oil in the manner just set forth.

It will be remembered that when the hydraulic unit is locked with the implement in raised position and with the valves in the position shown in Figure 6, rocking the valve cam 121 through substantially 60 degrees will open the valve 91 a small amount while the valve 112 is left in its wide open position, in order that the pump pressure will not tend to move the piston 21. The limited opening of the valve 91, as determined by the stop 150′, serves a very important purpose. Since the weight of the implement parts or other load associated with the lifting rock shaft 25 is imposed on the piston 21, the restriction to the flow of oil from the closed end of the cylinder 16 through the channels 85, 81 and 87 acts to cushion the lowering of the load.

While we have shown and described above the preferred structure in which the principles of the present invention have been embodied, it is to be understood that our invention is not to be limited to the specific details shown and described above, but that, in fact, widely different means may be employed in the practice of the broader aspects of our invention.

What we claim, therefore, and desire to secure by Letters Patent is:

1. In a hydraulic mechanism comprising a cylinder having a piston movable therein, a constantly driven hydraulic pump, a reservoir, a passage from said pump to said piston and a second passage from the pump to said reservoir, a first valve means biased for normally closing the passage from the pump to the cylinder, a second valve means in said second passage biased toward open position to permit said pump to discharge into said reservoir, means movable through successive positions for first opening the first valve means, to provide for the discharge of the fluid in the cylinder to the reservoir, and then closing the second valve means to build up pressure in said cylinder for moving said piston, means for holding said movable means in its various positions, and operating means momentarily movable from one position to another for shifting said movable means to its successive positions, said holding means serving to retain said movable means in the position to which it has been moved to provide for the return of said operating means to its first position.

2. In a hydraulic mechanism comprising a cylinder having a piston, a hydraulic pump, a reservoir, passages from said pump to said cylinder and to said reservoir, valve means controlling the flow of fluid through said passages, a successively operated cam member movable in one direction to one position to open said valve means for causing the same to open both of said passages, and movable in the same direction to another position to close the passage to said reservoir and open the passage to said cylinder to build up pressure therein, ratchet means for retaining said valve means in the position to which it is moved by said cam member, and separate ratchet means operable to successively advance said cam member.

3. In a hydraulic mechanism comprising a cylinder having a piston, a hydraulic pump, a reservoir, passages from said pump to said cylinder and to said reservoir, a valve for closing the passage to said cylinder, a second valve for closing the passage to said reservoir, means adapted to be shifted successively from one position to another for first holding both of said valves open to provide for the flow of liquid from the cylinder and said pump to said reservoir and then closing the second valve to divert the flow of liquid from said pump into said cylinder to build up pressure therein, holding means for retaining said successively shifted means in any position to which it is shifted, and means connected with said holding means and responsive to the movement of said piston to a certain position for shifting the position of said holding means for moving said successively shifted means to close said first valve to trap the liquid in said cylinder and hold said piston in said certain position, and for opening said second valve to divert the flow of liquid from said pump into said reservoir.

4. In a hydraulic mechanism comprising a cylinder having a piston, a hydraulic pump, a reservoir, passages from said pump to said cylinder and to said reservoir, a pair of interconnected valves, one controlling the passage to said cylinder and the other controlling the passage to said reservoir, spring means exerting a continuous bias tending to hold the first valve closed and the second valve open at all times, successively operated means for shifting both of said valves against the force of said continuous bias, first to a position in which said first valve is partially opened and said second valve is fully open and then to a position in which the second valve is closed and said first valve is fully open, and means acting against said bias for holding said last named means in either of its shifted positions.

5. In a hydraulic mechanism, a single acting cylinder having a piston movable therein and closed at one end, a hydraulic pump, a reservoir, passages from said pump to the closed end of said cylinder and to said reservoir, a pair of interconnected valves, one of said valves serving to close the passage to said cylinder from the pump and the other valve serving to open the passage from the pump to the reservoir, spring means acting against said valves and biasing them for movement to a position in which said one valve closes the passage between the cylinder and the pump and the other valve opens communication between the reservoir and said pump, said valves being connected to move together, and means for shifting said interconnected valves in two steps, the first shifting movement of said valves causing said one valve to partially open the passage from the pump to the cylinder while said second valve approaches its closed position but remains open a sufficient amount to maintain communication between the pump and the reservoir, whereby any fluid in said cylinder returns to the reservoir, the second step serving to completely close said second valve and completely open the first valve to divert all of the flow of fluid from the pump into the cylinder by closing all communication between the pump and the reservoir, whereby said piston is forced in one direction.

6. In a hydraulic mechanism comprising a cylinder having a piston, a hydraulic pump, a passage from the high pressure side of said pump to said cylinder, and a second passage from the high pressure side of said pump to the low pressure side of said pump, spring biased valve mechanism movable into either of three positions and including means for closing said first passage only when said mechanism is in its first position and means for closing said second passage only when said mechanism is in its third position, both passages being open when said valve mechanism is in its second position, a trip lever, means responsive to momentary operations of the trip lever for successively moving said valve mechanism from one position to another in sequential relation against said spring bias, and means for holding said valve mechanism in its various positions to prevent said spring bias from shifting said mechanism out of position.

7. In a hydraulic mechanism comprising a cylinder having a piston, a hydraulic pump, a passage from the high pressure side of said pump to said cylinder, and a second passage from the high pressure side of said pump to the low pressure side of said pump, valve mechanism movable into either of three positions and including means for closing said first passage only when said mechanism is in its first position and means for closing said second passage only when said mechanism is in its third position, both passages being open when said valve mechanism is in its second position, spring means biasing said valve mechanism for movement toward its first position, means for holding said valve mechanism in its second and third positions against the bias of said spring means, a trip lever, and valve control mechanism responsive to a momentary operation of said trip lever when said valve mechanism is in its second position for moving said valve mechanism into its third position to cause the flow of liquid from said pump to be diverted into said cylinder and cause actuation of said piston, and means carried by said holding means and adapted to shift the latter when said means reaches a certain position for moving said valve mechanism to its first position to cause the liquid in said cylinder to be trapped therein and hold said piston in said certain position and to cause the flow of liquid from said pump to be diverted through said second passage back to the pump.

8. In a hydraulic mechanism comprising a cylinder having a piston, a hydraulic pump, a passage from the high pressure side of said pump to said cylinder, and a second passage from the high pressure side of said pump to the low pressure side of said pump, valve mechanism movable into either of three positions and including means for closing said first passage only when said mechanism is in its first position and means for closing said second passage only when said mechanism is in its third position, both passages being open when said valve mechanism is in its second position, a trip lever, and valve control mechanism for holding said valve mechanism in its second position and responsive to a momentary operation of said trip lever for moving said valve mechanism into its third position to cause the flow of liquid from said pump to be diverted into said cylinder and cause actuation of said piston, and responsive to the movement of said piston to a certain position for moving said valve mechanism to its first position to cause the liquid in said cylinder to be trapped therein and hold said piston in said certain position and to cause the flow of liquid from said pump to be diverted through said second passage back to the pump, said control mechanism being responsive to a second momentary operation of said trip lever to move said valve mechanism to its second position to permit the liquid trapped in said cylinder to return through said second passage back to said pump.

9. In a hydraulic mechanism comprising a cylinder having a piston, a hydraulic pump, and a passage from said pump having a branch leading to said cylinder and a second branch leading back to said pump, a valve for closing said second branch, valve control mechanism comprising a cam operatively associated with said valve to control the position thereof, a trip lever, means responsive to the operation of said trip lever to rotate said cam to a certain position to hold said valve closed to cause the liquid from said pump to be diverted into said cylinder and cause actuation of said piston, means responsive to the movement of said piston to a particular position to rotate said cam an additional amount to another certain position to open said valve to permit the flow of liquid from said pump thereafter to flow through said second branch back to said pump, and means for holding said piston in said particular position.

10. In a hydraulic mechanism comprising a cylinder having a piston, a hydraulic pump, a passage from the high pressure side of said pump to said cylinder, and a second passage from the high pressure side of said pump to the low pressure side of said pump, valve mechanism movable into either of three positions and including means for closing said first passage only when said mechanism is in its first position and means for closing said second passage only when said mechanism is in its third position, both passages being open when said valve mechanism is in its second position, and a unidirectional and step-by-step operable valve control mechanism operatively associated with said valve mechanism including a rotatable member movable successively into three positions corresponding to the positions of said valve mechanism and an oscillatory member operatively connected with said rotatable member for successively advancing the same in one direction to successively position the valve mechanism in its different positions.

11. In a hydraulic mechanism comprising a cylinder having a piston, a hydraulic pump, a passage from the high pressure side of said pump to said cylinder, and a second passage from the high pressure side of said pump to the low pressure side of said pump, valve mechanism movable into either of three positions and including means for closing said first passage only when said mechanism is in its first position and means for closing said second passage only when said mechanism is in its third position, both passages being open when said valve mechanism is in its second position, and valve control mechanism comprising a cam operatively associated with said valve mechanism to control the position thereof, and a unidirectionally operable ratchet mechanism for controlling the position of said cam.

12. In a hydraulic mechanism comprising a cylinder having a piston, a hydraulic pump, a passage from the high pressure side of said pump to said cylinder, and a second passage from the high pressure side of said pump to the low pressure side of said pump, valve mechanism movable into either of three positions and including means for closing said first passage only when said mechanism is in its first position and means for closing said second passage only when said mechanism is in its third position, both passages being open when said valve mechanism is in its second position, valve control mechanism comprising a cam operatively associated with said valve mechanism to control the position thereof, and a unidirectionally operable ratchet mechanism for controlling the position of said cam, an operator controlled trip lever for actuating said ratchet mechanism, and means responsive to movement of said piston for actuating said ratchet mechanism.

13. In a hydraulic mechanism comprising a cylinder having a piston, a hydraulic pump, a passage from the high pressure side of said pump to said cylinder, and a second passage from the high pressure side to said pump to the low pressure side of said pump, valve mechanism movable into either of three positions and including means for closing said first passage only when said mechanism is in its first position and means for closing said second passage only when said mechanism is in its third position, both passages being open when said valve mechanism is in its second position, and valve control means comprising a cam operatively associated with said valve mechanism and arranged to move to three different positions, corresponding to the three positions of said valve mechanism, a ratchet movable with said cam, means to successively position said ratchet and the associated valve mechanism in its several positions, and means disposed in the path of movement of the piston to cause the cam to be advanced to a certain position by the movement of the piston.

14. The combination with a tractor body, of a detachable housing adapted to be fixedly secured to the tractor body, an actuating rock shaft mounted on and extending into one portion of said housing for application to or removal from the tractor body therewith, a power cylinder carried by said detachable housing and extending into the tractor body when the housing is attached, a piston movable in said cylinder, operating connections between the piston and said rock shaft, hydraulic means for delivering liquid under pressure to said cylinder for rocking said rock shaft, and a power take-off shaft mounted in the other portion of said housing and serving to drive said hydraulic means.

15. A hydraulic power lift mechanism for a tractor, comprising a first housing in the form of an integral casting having a shaft journaled therein, a cylinder separate from said integral casting and having an open end secured over an opening in said first housing, a piston in said cylinder operatively connected with said shaft, a fluid pump supported on said first housing, a second housing detachably connected to said first housing and having a chamber formed integrally therein, a passage formed in said integral casting constituting the first housing and connecting the high pressure side of said pump with said chamber, a second passage formed integrally with said first housing and connecting said chamber with the closed end of said cylinder, a valve in said chamber for controlling the flow of liquid from said first passage through said second passage to said cylinder, and mechanism in said second housing for controlling said valve.

16. A hydraulic mechanism comprising a power cylinder, a movable piston mounted therein, a pump, means including a shiftable valve for controlling the application of fluid pressure to said cylinder and biased to return to an initial position, means including a trip lever for momentarily shifting said valve to another position against said bias, and means for holding the valve in said position to provide for the return of the trip lever to its original position while continuing the operation of the hydraulic mechanism according to the setting of the valve in its said other position to which it was moved by the momentary actuation of said trip lever.

17. In a hydraulic mechanism comprising a cylinder having a piston, a hydraulic pump, a passage from said pump having a branch leading to said cylinder and a second branch leading back to said pump, interconnected valve means controlling the flow through said branches, cam means for moving said interconnected valves into successive positions, ratchet mechanism for advancing said cam means to move said valves, and separate ratchet mechanism associated with said cam means for holding the interconnected valves in selected position.

18. In a hydraulic mechanism comprising a cylinder having a piston, a hydraulic pump, a passage from said pump having a branch leading to said cylinder and a second branch leading back to said pump, valve mechanism controlling the flow through said branches, a cam member for successively advancing said valve mechanism to different positions, a rock shaft upon which said cam member is journaled, and ratchet mechanism actuated by the rocking of said shaft for advancing said cam member.

19. In a hydraulic mechanism comprising a cylinder having a piston, a hydraulic pump, a passage from said pump having a branch leading to said cylinder and a second branch leading back to said pump, valve mechanism controlling the flow through said branches, a cam member for successively advancing said valve mechanism to different positions, a rock shaft upon which said cam member is journaled, ratchet mechanism actuated by the rocking of said shaft for advancing said cam member, a locking member mounted for relative rotation with respect to said shaft, and means associated with said locking member and said cam member for holding the latter in the position to which it is advanced by said ratchet mechanism.

20. In a hydraulic mechanism comprising a cylinder having a piston, a hydraulic pump, a passage from said pump having a branch leading to said cylinder and a second branch leading back to said pump, valve mechanism controlling the flow through said branches, a cam member for successively advancing said valve mechanism to different positions, a rock shaft upon which said cam member is journaled, ratchet mechanism actuated by the rocking of said shaft for advancing said cam member, said ratchet mechanism including a ratchet wheel fixed to rotate on said shaft with said cam member, and a locking member journaled for rotation with respect to said ratchet wheel and including a pawl engageable with the latter for holding the cam member and the associated valve mechanism in the position to which they are advanced by said ratchet mechanism.

21. In a hydraulic mechanism comprising a cylinder having a piston, a hydraulic pump, a passage from said pump having a branch leading to said cylinder and a second branch leading back to said pump, valve mechanism controlling the flow through said branches, a rock shaft disposed adjacent said valve mechanism, a cam member of symmetrical construction and embodying two identical parts arranged in diametrically opposite relation, said cam member being mounted for rotation on said shaft and controlling the position of said valve mechanism, a ratchet wheel also mounted for rotation on said shaft and fixed with respect to said cam member, said ratchet wheel having a set of teeth for each part of said symmetrical cam member, a pawl arm fixed to said shaft and carrying a pawl engageable with said ratchet wheel for advancing the latter to position said cam member and the associated valve mechanism, and means for rocking said shaft.

22. A hydraulic mechanism comprising a housing including a cylinder having a piston therein, a hydraulic pump supported on said housing, means establishing a passage from said pump having a branch leading to said cylinder and a second branch leading back to said pump, valve mechanism for controlling the flow through said branches, a shaft journaled for rocking movement in said housing adjacent said valve mechanism, a cam member journaled for rotation on said shaft and operable for controlling the position of said valve mechanism, a ratchet wheel fixed to said cam member, a pawl arm fixed to said shaft and having a pawl engageable with said ratchet wheel for advancing said cam member and the associated valve mechanism when the shaft is rocked in one direction, a locking arm mounted for rotation with respect to said shaft and including a part engageable with said housing for limiting the rocking movement of the locking arm with respect to the latter, and pawl means carried by said locking arm and engageable with said ratchet wheel for holding the latter and said cam member in position to provide for the return of said rock shaft to its initial position.

23. A hydraulic mechanism comprising a casing, a cylinder supported thereby and including a piston movable therein, a lifting rock shaft journaled for rocking movement in said casing and including an arm oscillatable therein, means connecting said arm with said piston, a hydraulic pump carried by said casing, means establishing a passage leading from said pump to said cylinder, a reservoir formed in said casing, means establishing a passage leading from the pump to said reservoir, valve mechanism controlling the flow through said passages, means for controlling said valve mechanism including step by step operable means associated with said valve mechanism to successively position the latter in different positions, and means associated therewith and arranged to be engaged by said arm when said piston has been moved to a certain position to shift said valve mechanism to its next position.

24. A hydraulic mechanism comprising a casing, a cylinder supported thereby including a piston movable therein, means establishing a liquid reservoir in said casing, a hydraulic pump supported by said casing, means establishing a passage from the high pressure side of said pump to said cylinder and a second passage from said cylinder and pump to said reservoir, valve mechanism controlling the flow through said passages, a control shaft journaled for rocking movement in said casing, valve control mechanism including a cam member mounted for rotation on said shaft and operatively associated with said valve mechanism for successively moving the latter to different positions, ratchet means actuated by rocking of said shaft for advancing said cam member to various positions, an arm mounted for relative rotation with respect to said cam member and said shaft, means operatively connecting said arm with said cam member for preventing rotation of the latter in one direction away from the position to which it has been moved by said ratchet mechanism, said arm reacting against said casing, and an extension formed on said arm and adapted to be engaged when said piston has been moved to a certain position for shifting said arm and thereby moving said cam member and the associated valve mechanism to another position.

25. In a tractor having a rear axle housing provided with a rearwardly facing central opening and enclosing a pair of laterally spaced drive gears, hydraulic power lift mechanism comprising a generally vertically arranged housing adapted to be secured to said axle housing over said rearwardly facing opening, said housing including a reservoir in the lower portion thereof and bearing means in said housing adjacent said reservoir to receive a power take-off shaft, a rock shaft disposed in the upper portion of said housing, a forwardly extending cylinder secured to said housing and extending in between said drive gears, a piston movably supported in said housing, operating connections between said piston and said rock shaft, and pump means carried by said housing and driven by said power take-off shaft for actuating said piston and associated parts.

26. In a tractor having a rear axle housing provided with a rearwardly facing central opening and enclosing a pair of laterally spaced drive gears, hydraulic power lift mechanism comprising a generally vertically arranged main housing adapted to be secured to said axle housing over said rearwardly facing opening, said main housing including a reservoir in the lower portion thereof and bearing means in said housing adjacent said reservoir to receive a power take-off shaft, a rock shaft disposed in the upper portion of said main housing, a forwardly extending cylinder secured to said main housing and extending in between said drive gears, a piston movably supported in said housing, operating connections between said piston and said rock shaft, a pump housing secured to said main housing adjacent the lower portion thereof and embracing said power take-off shaft, pump mechanism driven from the latter disposed in said pump housing, a valve housing attached to said main housing at the upper portion thereof, passageways in said housings leading from the pump to said reservoir and cylinder through said valve housing, valve mechanism disposed in the latter for controlling the flow of fluid through said passageways, and means carried by one of said housings for operating said valve mechanism.

27. In a tractor having a rear axle housing provided with a rearwardly facing central opening and enclosing a pair of laterally spaced drive gears, hydraulic power lift mechanism comprising a generally vertically arranged main housing adapted to be secured to said axle housing over said rearwardly facing opening, a power lift rock shaft journaled for rocking movement in the upper portion of said power lift housing, a cylinder secured to said housing and disposed between said pair of spaced drive gears and substantially perpendicular with respect to the transverse vertical plane of said main housing, a movable piston mounted in said cylinder, operating connections between said shaft and piston, and pump means carried at the lower portion of said main housing for actuating said piston.

28. In a tractor having a rear axle housing provided with a rearwardly facing central opening and enclosing a pair of laterally spaced drive gears, power lift mechanism comprising a vertically arranged housing adapted to be secured to said axle housing over said rearwardly facing opening and partially embracing said drive gears, a power lift shaft journaled for movement in the upper portion of said power lift housing substantially above the rear portions of said drive gears, operating means for actuating said power lift shaft and including an operating part disposed in a position between said spaced drive gears, a shaft disposed in the lower portion of said housing substantially underneath said power lift shaft for driving said power lift mechanism, means operatively connecting said part with one of said shafts, and means connecting the other shaft with said operating means.

29. In a tractor having a rear axle housing provided with a rearwardly facing central opening and enclosing a pair of laterally spaced drive gears, power lift mechanism comprising a vertically arranged housing adapted to be secured to said axle housing over said rearwardly facing opening and partially embracing said drive gears, a transverse power lift rock shaft journaled for rocking movement in the upper portion of said power lift housing substantially above the rear portions of said drive gears, an arm carried by said shaft and movable therewith in a generally vertical longitudinal plane, operating means for actuating said power lift shaft and including an operating part connected with said arm and disposed in a generally vertical longitudinal plane passing between said spaced drive gears, and means including a substantially horizontal longitudinal shaft disposed in the lower portion of said housing substantially underneath said power lift rock shaft for driving said power lift mechanism.

30. In a tractor having a power take off shaft and a rear axle housing provided with an opening and enclosing a pair of laterally spaced drive gears, hydraulic power lift mechanism comprising a generally vertically arranged housing adapted to be secured to said axle housing over said opening and including a reservoir in the lower portion thereof, a shaft disposed in the upper portion of said housing, a forwardly extending cylinder secured to said housing and extending in between said drive gears, a piston movably supported in said cylinder, operating connections between said piston and said shaft, and pump means carried by said housing and driven by said power take-off shaft for actuating said piston and associated parts.

31. In a tractor having a power take off shaft and a rear axle housing provided with an opening and enclosing a pair of laterally spaced drive gears, hydraulic power lift mechanism comprising a hydraulic casing unit adapted to be secured to said axle housing over said opening and including a reservoir and a cylinder, a portion of said casing unit extending in between said drive gears, a power lift shaft journaled in said casing unit, a piston movably supported in said cylinder and connected with said shaft, and pump means carried by said housing and driven by said power take-off shaft for actuating said piston and associated parts.

32. In a tractor having a rear axle housing provided with an opening and enclosing a pair of laterally spaced drive gears, hydraulic power lift mechanism comprising a generally vertically arranged housing adapted to be secured to said axle housing over said opening and including a reservoir in the lower portion thereof and bearing means in said housing adjacent said reservoir to receive a power take-off shaft, a shaft disposed in the upper portion of said housing, means serving as a cylinder carried by said housing, the latter extending in between said drive gears, a piston movably supported in said cylinder and connected with said second shaft, and pump means carried by said housing and driven by said power take-off shaft for actuating said piston and associated parts.

33. The combination with a tractor body, of a detachable housing adapted to be fixedly secured to the tractor body, a shaft mounted on and extending into one portion of said housing for application to or removal from the tractor body therewith, a power cylinder carried by said detachable housing and attached to the tractor body when the housing is attached, a piston movable in said cylinder and connected with said shaft, hydraulic means for delivering liquid under pressure to said cylinder for actuating said shaft, and a power take-off shaft mounted in the other portion of said housing and serving to drive said hydraulic means.

34. In a tractor having a rear axle and transmission casing provided with an opening therein, hydraulic power lift mechanism including a housing adapted to be disposed over the opening in said casing, a reservoir for hydraulic fluid formed in the lower portion of said housing, a power lift shaft journaled in the upper portion of said housing, a hydraulic pump adjacent and in communication with said reservoir in the lower part of said housing, operative connections between said pump and shaft for actuating the latter, and a power shaft in said casing for driving said pump.

35. The combination with a tractor body, of a detachable housing adapted to be fixedly secured to the tractor body, a shaft mounted on and extending into one portion of said housing for application to or removal from the tractor body with said housing, a power cylinder carried by said housing and attached to the tractor body when the housing is attached, a piston movable within said cylinder and adapted to actuate said shaft, bearing means in another portion of said housing, a power take-off shaft mounted in said bearing means, and pump means for delivering fluid under pressure to said cylinder to actuate said first shaft, said pump means being disposed within said detachable housing and driven by said power take-off shaft.

36. The combination with a tractor body, of a housing adapted to be fixedly secured to the tractor body, a power lift shaft mounted within and extending out of one portion of said housing, a power cylinder carried by said housing, a piston movable within said cylinder and adapted to actuate said shaft, bearing means in another portion of said housing, a power take-off shaft mounted in said bearing means, and hydraulic means driven from said power take-off shaft for delivering liquid under pressure to said cylinder.

37. In combination with a tractor having a rear axle housing with a rearwardly facing opening therein, a power lift housing detachably secured to said axle housing over the rearwardly facing opening therein, power lift mechanism disposed within said housing, a portion of said mechanism projecting into said axle housing, a power lift shaft supported entirely on and extending out of one portion of said power lift housing for application to or removal from the tractor with the housing, operating means for rotating said power lift mechanism, bearing means in another portion of said power lift housing, a power take-off shaft supported in said bearing means, and means operatively connected to said power take-off shaft for actuating said operating means to drive said power lift shaft.

38. In combination with a tractor having a body, power lift mechanism comprising a housing detachably secured to said body, a power lift shaft journaled in one portion of said housing, operating means for actuating said power lift shaft including hydraulic mechanism, bearing means in another portion of said housing, a power take-off shaft supported in said bearing means, and pump means for actuating said hydraulic mechanism including a gear mounted directly on said power take-off shaft.

39. In a tractor having a rear axle housing provided with a rearwardly facing central opening and enclosing a pair of laterally spaced drive gears, power lift mechanism comprising a generally vertically arranged main housing adapted to be secured to said axle housing over said rearwardly facing opening, a power lift shaft journaled in the upper portion of said power lift housing, operating means disposed between said drive gears for rotating said power lift shaft, and actuating means disposed in the lower portion of said main housing beneath said power lift shaft for actuating said operating means to rotate said shaft.

ELMER McCORMICK.
MILFORD D. STEWART.
WAYNE H. WORTHINGTON.